United States Patent
Ogura

(10) Patent No.: US 9,335,619 B2
(45) Date of Patent: May 10, 2016

(54) LUMINESCENT LIGHT EMITTING DEVICE HAVING LUMINESCENT MATERIAL PLATE THAT IS CAUSED TO BE LUMINOUS BY EXCITATION LIGHT SOURCE AND PROJECTOR INCLUDING SAME LUMINESCENT LIGHT EMITTING DEVICE

(71) Applicant: CASIO COMPUTER CO., LTD., Shibuya-ku, Tokyo (JP)

(72) Inventor: Naotsugu Ogura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 82 days.

(21) Appl. No.: 14/486,817

(22) Filed: Sep. 15, 2014

(65) Prior Publication Data

US 2015/0085262 A1 Mar. 26, 2015

(30) Foreign Application Priority Data

Sep. 20, 2013 (JP) ................................ 2013-195273

(51) Int. Cl.
*F21V 9/10* (2006.01)
*G03B 21/20* (2006.01)
*F21V 13/08* (2006.01)
*F21V 13/02* (2006.01)

(52) U.S. Cl.
CPC .............. *G03B 21/2086* (2013.01); *F21V 9/10* (2013.01); *F21V 13/02* (2013.01); *F21V 13/08* (2013.01); *G03B 21/204* (2013.01)

(58) Field of Classification Search
CPC ......... G03B 21/204; F21V 9/10; F21V 13/08; F21V 13/02
USPC ....................................... 362/614, 84; 353/84
See application file for complete search history.

(56) References Cited

U.S. PATENT DOCUMENTS

| 8,348,432 B2 | 1/2013 | Miyazaki |
| 8,662,673 B2 | 3/2014 | Miyazaki |
| 2014/0232707 A1 | 8/2014 | Alschinger et al. |
| 2015/0002822 A1 | 1/2015 | Hamamura |

FOREIGN PATENT DOCUMENTS

| JP | 2003295319 A | 10/2003 |
| JP | 2004341105 A | 12/2004 |
| JP | 2011013320 A | 1/2011 |
| WO | 2013029888 A1 | 3/2013 |
| WO | 2013132634 A1 | 9/2013 |

OTHER PUBLICATIONS

Extended European Search Report dated Feb. 18, 2015, issued in counterpart European Application No. 14185048.7.

*Primary Examiner* — William C Dowling
(74) *Attorney, Agent, or Firm* — Holtz, Holtz & Volek PC

(57) ABSTRACT

There is provided a luminescent light emitting device including a mirror layer, a luminescent material plate that is formed on one surface side of the mirror layer, and a conductive thin wire film in which a conductive thin wire is disposed and that lies on the other surface side of the mirror layer, in that luminescent light that is emitted by the luminescent material plate is emitted to the front that is one surface side of the luminescent material plate by the mirror layer, and damage done to the luminescent material plate is detected by a disconnection of the conductive thin wire.

19 Claims, 13 Drawing Sheets

LUMINESCENT LIGHT EMITTING DEVICE HAVING LUMINESCENT MATERIAL PLATE THAT IS CAUSED TO BE LUMINOUS BY EXCITATION LIGHT SOURCE AND PROJECTOR INCLUDING SAME LUMINESCENT LIGHT EMITTING DEVICE

CROSS-REFERENCE TO RELATED APPLICATION

This application is based upon and claims the benefit of priority under 35 USC 119 from the prior Japanese Patent Application No. 2013-195273 filed on Sep. 20, 2013, the entire disclosure of which, including its description, claims, drawings and abstract, are incorporated herein by reference.

BACKGROUND OF THE INVENTION

1. Field of the Invention

The present invention relates to a luminescent light emitting device having a luminescent material plate that is caused to be luminous by an excitation light source and a projector including the same luminescent light emitting device.

2. Description of the Related Art

In these days, data projectors are used on many occasions as an image projection system which projects images including an image of a screen or a video image of a personal computer, as well as images based on image data which is stored on a memory card on to a screen. Conventionally, the mainstream of these projectors has been those which utilize a high-intensity discharge lamp as a light source. In recent years, however, there have been made many developments and proposals on light source devices which use, as a light emitting element of a light source, a light emitting diode (LED) or a laser oscillator, an organic EL device, a luminescent material or the like.

For example, Japanese Unexamined Patent Publication No. 2004-341105 proposes a light source device in which a red luminescent material layer, a green luminescent material layer and a blue luminescent material layer are provided in an end-to-end fashion on a surface of a color wheel that is made up of a light transmitting circular disc, a dichroic filter that transmits ultraviolet radiation and reflects visible light is disposed on a rear surface of a luminescent material plate, and light source lights in red, green and blue wavelength ranges are generated by shining ultraviolet light from a rear surface side of the luminescent material plate on to the luminescent material layers.

In addition, in Japanese Unexamined Patent Publication No. 2011-13320, the applicant of this patent application proposes a light source device that includes a laser oscillator as an excitation light source and a luminescent material plate of which a luminescent material layer is formed on a reflecting surface. In this proposal, a laser beam is shone on to the luminescent material layer from the laser oscillator, and luminescent light that is emitted from a luminescent material of the luminescent material layer is extracted from the same surface as the surface on to which the laser beam is shone on for use as light source light.

In a projector that uses a laser oscillator like the one described above, the laser beam that is emitted from the laser oscillator is coherent light in which phases are aligned, and therefore, it is necessary to prevent the laser beam from being emitted directly to the outside of the projector. Even in the case of the laser beam being prevented from leaking to the outside of the projector, when the laser beam is shone on to other positions than a predetermined position, there is caused a problem that a member lying in the position on to which the laser beam is shone is damaged.

Additionally, Japanese Unexamined Patent Publication No. 2003-295319 proposes a projector in which coherent light emitted from a laser oscillator is converted into incoherent light by a luminescent plate or a diffuse plate so that the incoherent light is emitted to the outside of the projector, whereby the laser beam is prevented from being emitted directly to the outside of the projector as light source light.

In this projector, a safety device is additionally provided to turn off the laser oscillator when the fall of the luminescent material or the diffuse plate is detected, or a diffuse plate is further disposed on the optical path of the incoherent light to enhance the safety of the projector. Namely, in these projectors, when the luminescent material or the diffuse plate falls, the safety device is activated to stop the emission of a laser beam from the laser oscillator momentarily so as to shorten the time during which the laser beam is shone on to other positions than the predetermined position within the projector or the laser beam leaks directly to the outside of the projector as short as possible, whereby the safety is ensured.

As has been described above, there is the projector in which light emitted from the excitation light source is shone on to the luminescent material layer and the luminescent light emitted from the luminescent material of the luminescent material layer is used as the light source light. In this projector, the quantity of luminescent light that is emitted from the luminescent material of the luminescent material layer can be increased by increasing the output of the excitation light source. However, in the case of the laser oscillator being used as the excitation light source, in the event that the power of the laser beam that is emitted from the laser oscillator is increased, there are fears that a brightness saturation is generated in the luminescent material or that a failure or damage is caused by burning. This results from time to time in complexity or difficulty in incorporating a detecting device or a detecting circuit for detecting the failure, damage or the like.

SUMMARY OF THE INVENTION

The invention has been made in view of the problem inherent in the related art, and an object of the invention is to provide a luminescent light emitting device, as a light source device, that can ensure the safety thereof by detecting the occurrence of damage or abnormality in a luminescent material in an ensured fashion so as to stop a laser light source that emits excitation light and a safe projector that utilizes this luminescent light emitting device.

According to the invention, it is possible to provide a safe luminescent light emitting device that not only stops an excitation light source by detecting damage done to a luminescent material but also stops the luminescent light emitting device itself when abnormality occurs therein and a projector that not only enables a highly bright projection but also ensures the safety thereof by including the luminescent light emitting device.

According to an aspect of the invention, there is provided a luminescent light emitting device including a mirror layer, a luminescent material plate that is formed on one surface side of the mirror layer and a conductive thin wire film in which a conductive thin wire is disposed and that lies on the other surface side of the mirror layer, wherein luminescent light that is emitted by the luminescent material plate is emitted to the front that is one surface side of the luminescent material plate by the mirror layer, and wherein damage done to the luminescent material plate is detected by a disconnection of the conductive thin wire.

DETAILED DESCRIPTION OF THE INVENTION

Figure 1:
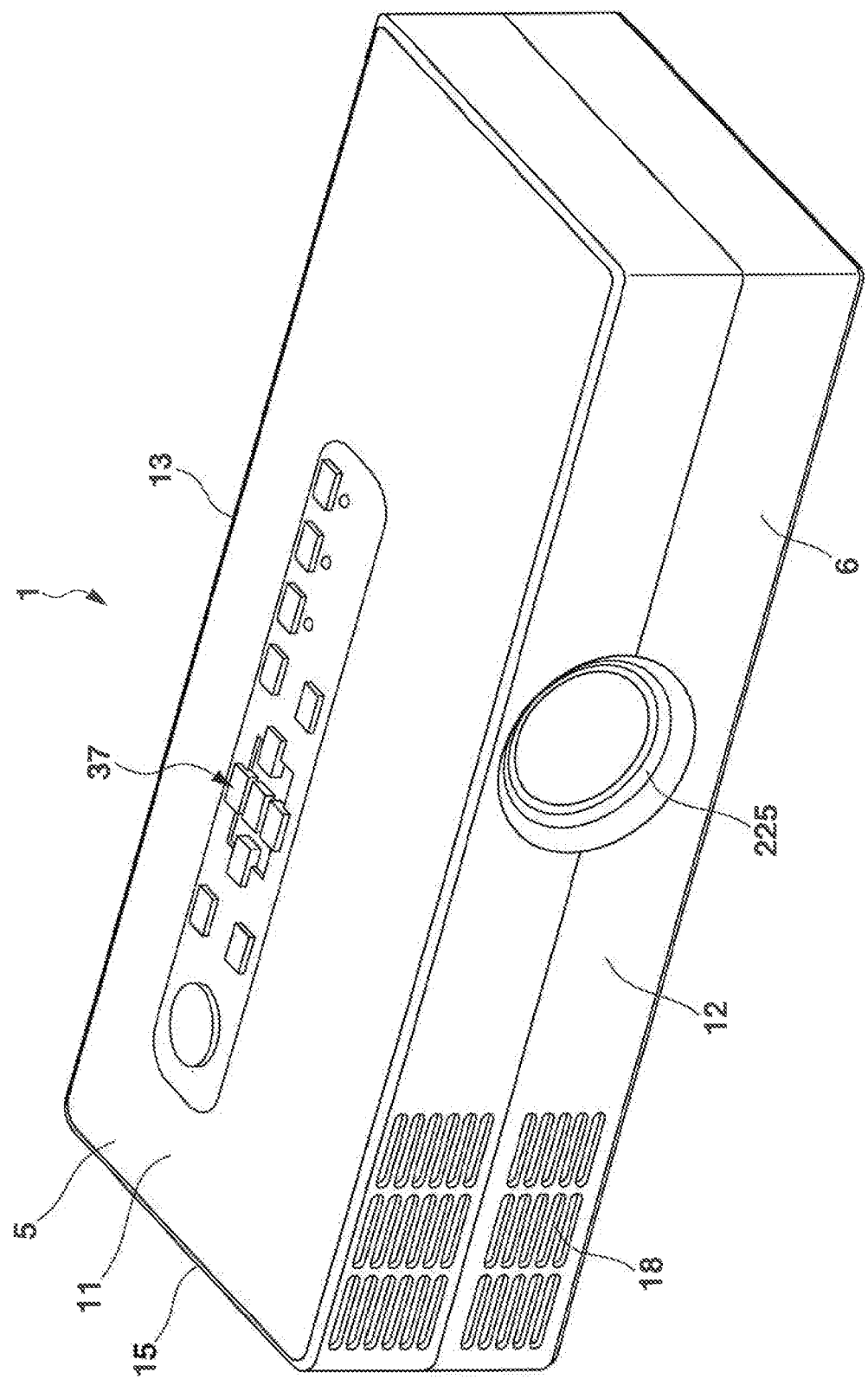
FIG. 1 is an external perspective view showing an example of a projector according to an embodiment of the invention.

Hereinafter, a best mode for carrying out the invention will be described by the use of the accompanying drawings. Although the following embodiments have various preferred technical limitations for carrying out the invention, those technical limitations are not intended to limit the scope of the invention to the embodiments and illustrated examples.

An embodiment of the invention will be described below. A projector 1 that includes a luminescent light emitting device 100 according to the invention includes a light source unit 60, a display element 51, a projection optical system, a light guiding optical system 170 that guides light emitted from the light source unit 60 to the display element 51 and that aligns projection light generated at the display element 51 with an optical axis of the projection optical system, and a projector control unit that controls the light source unit 60 and the display element 51.

This light source unit 60 includes an excitation light shining device 70 that includes excitation light sources 71 and a microlens array 75, a luminescent material plate 101 that includes a green luminescent material layer that emits light in the green wavelength range by receiving light emitted from the excitation light sources 71, a red light source 121 that emits light in the red wavelength range, a blue light source 131 that emits light in the blue wavelength range, and a light source optical system 140 that changes the directions of axes of the lights in the red, green and blue wavelength ranges into the same direction to guide the lights to a predetermined plane.

The microlens array 75 of the excitation light shining device 70 is disposed between the excitation light sources 71 and the luminescent material plate 101 and has a plurality of convex microlenses. The convex microlenses have a similar or analogous shape to the shape of a luminescent material layer on the luminescent material plate 101 and are arranged into a matrix. The microlens array 75 converts light emitted from the excitation light sources 71 into a plurality of pencils of light, which are then shone on to the luminescent material plate 101 of the luminescent light emitting device 100.

Additionally, a reflecting mirror layer 102 is formed on a rear surface, which is the other surface, of the luminescent material plate 101. Namely, the luminescent material plate 101 that is made into a square luminescent material layer is disposed at the front of the reflecting mirror layer 102. Further, a conductive thin wire film 105 is formed on a rear side of the reflecting mirror layer 102.

This conductive thin wire film 105 that is formed on a rear surface side of the luminescent material plate 101 is intended to detect damage done to the luminescent material plate 101. The conductive thin wire film 105 can stop the operation of the light source unit 60 in case that damage is caused in the luminescent material plate 101.

Further, in the light source unit 60, a collective lens 110 is disposed near the luminescent material plate 101, whereby the pencils of light that pass through the convex microlenses of the microlens array 75 are collected to be shone on to the luminescent material plate 101 by the collective lens 110 so that their central positions are superposed one on another on the luminescent material plate 101.

Hereinafter, the embodiment of the invention will be described in detail based on the accompanying drawings. FIG. 1 is an external perspective view of the projector 1. In this embodiment, when left and right are referred to in relation to the projector 1, they denote, respectively, left and right in relation to a projecting direction, and when front and rear are referred to in relation to the projector 1, they denote, respectively, front and rear in relation to the projecting direction of the projector 1 and a traveling direction of a pencil of light emitted from the projector 1 towards the screen.

As is shown in FIG. 1, the projector 1 is a small projector 1 that has a substantially rectangular parallelepiped shape. In this projector 1, an interior is covered by an upper case and a lower case 6. A lens barrel 225 is disposed substantially in the center of a front panel 12 that is formed when the upper case 5 and the lower case 6 are fitted together and that constitutes a front of a projector casing. Additionally, outside air inlet slits 18 are formed in the front panel 12 on a side near a right-hand side panel 15.

In addition, a keys/indicators unit 37 is provided on an upper panel 11 of the projector casing that is formed by the upper case 5. Disposed on this keys/indicators unit 37 are keys and indicators which include a power supply switch key, a power indicator which informs whether the power supply is on or off, a projection switch key which switches on or off the projection by the projector 1, an overheat indicator which informs of an overheat condition when the light source unit, the display element, a control circuit or the like overheats, and the like.

Further, provided in a back panel 13 and the right-hand side panel 15 that are formed by fitting the upper case 5 and the lower case 6 together are various terminals such as USB terminals, a power supply adaptor plug, an insertion slot for a memory card, and the like.

Figure 2:
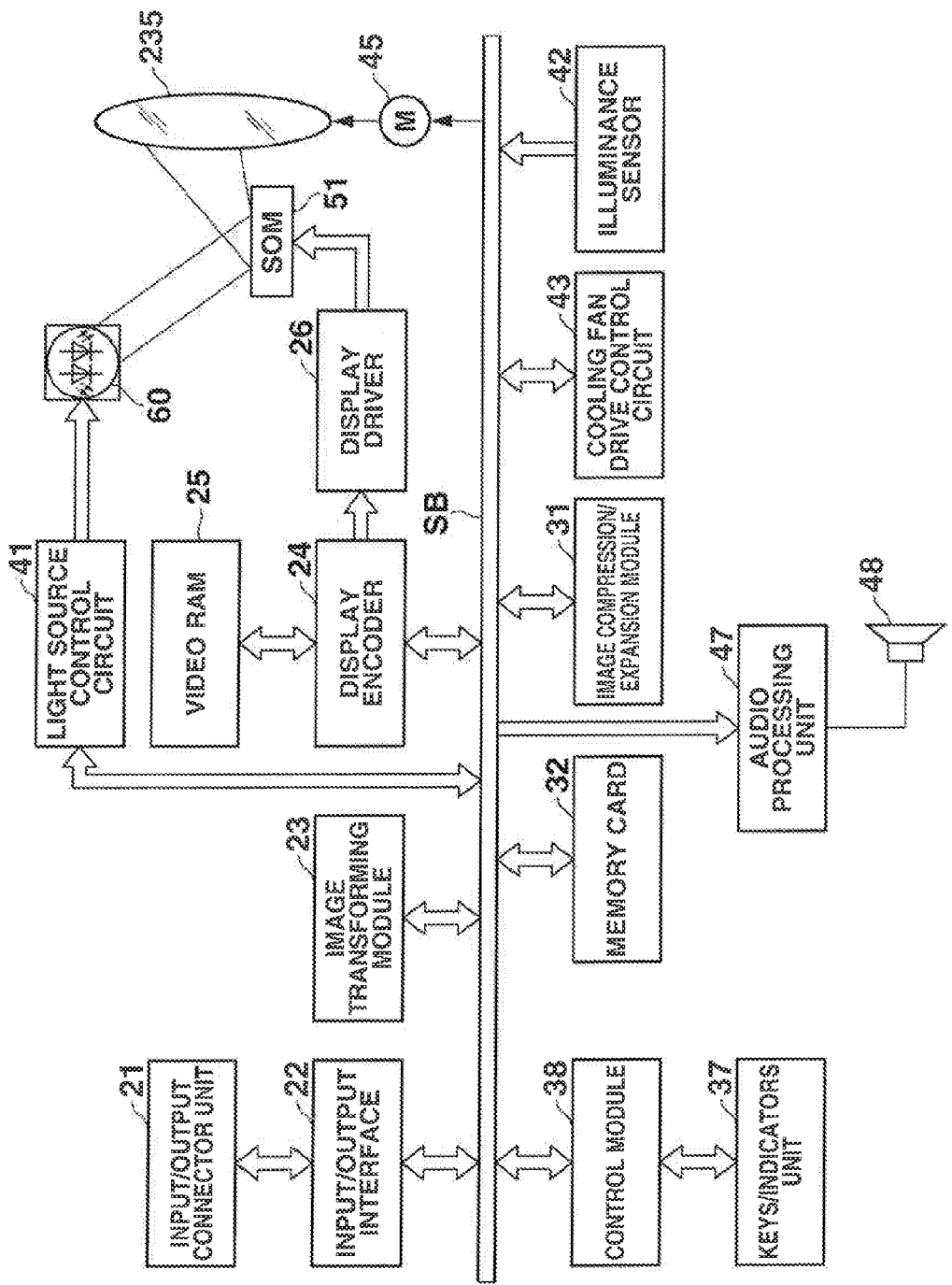
FIG. 2 is a functional block diagram showing an example of a functional block of the projector according to the embodiment of the invention.

Next, the projector control unit of the projector 1 will be described by the use of a functional block diagram shown in FIG. 2. The projector control unit includes a control module 38, an input/output interface 22, an image transforming module 23, a display encoder 24, a display driver 26 and the like.

This control module 38 governs the control of respective operations of circuitries within the projector 1 and is made up of a CPU as an arithmetic and logic unit, a ROM which stores in a fixed fashion operation programs of various types of settings, a RAM which is used as a working memory, and the like.

Image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives the display element 51, which is a spatial optical modulator (SOM), at an appropriate frame rate in response to the image signal outputted from the display encoder 24.

Then, in this projector 1, a pencil of light that is emitted from the light source unit 60, that is, the pencils of light that are collected on to the predetermined plane by the light source optical system 140 of the light source unit 60, is shone onto the display device 51 via the light guiding optical system 170 to thereby form an optical image using reflected light that is reflected by the display element 51. The image so formed is then projected on to a screen, not shown, for display thereon via the projection optical system, which will be described later.

In addition, a movable lens group 235 of the projection optical system is driven by a lens motor 45 for zooming or focusing.

In addition, when in a reproducing mode, an image compression/expansion module 31 reads out image data recorded on the memory card 32 and expands individual image data that make up a series of dynamic images frame by frame. Then, the image data is outputted to the display encoder 24 via the image transforming module 23 so as to enable the display of dynamic images and the like based on the image data stored on the memory card 32.

Operation signals generated at the keys/indicators unit 37 that is provided on the upper case 5 of the projector casing are sent out directly to the control module 38. In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 that is configured as a light source control unit. This light source control circuit 41 controls separately the emission of light from the excitation light shining device 70, a red light source device 120 and a blue light source device 130 of the light source unit 60 so that light source lights in the predetermined wavelength ranges that are required when an image is generated are emitted from the light source unit 60.

Further, the control module 38 causes a cooling fan drive control circuit 43 to detect temperatures through a plurality of temperature sensors which are provided in the light source unit 60 and the like so as to control the rotating speeds of cooling fans based on the results of the temperature detections.

Furthermore, the projector control unit includes an illuminance sensor 42 that is an illuminance measuring module for measuring the illuminance of light emitted from the light source unit 60. Then, the control module 38 controls a voltage that is applied to the respective light sources of the light source devices of the light source unit 60 based on information on outputs of the lights in the wavelength ranges that is sent out from the illuminance sensor 42 so as to control and hold a brightness balance.

Figure 3:
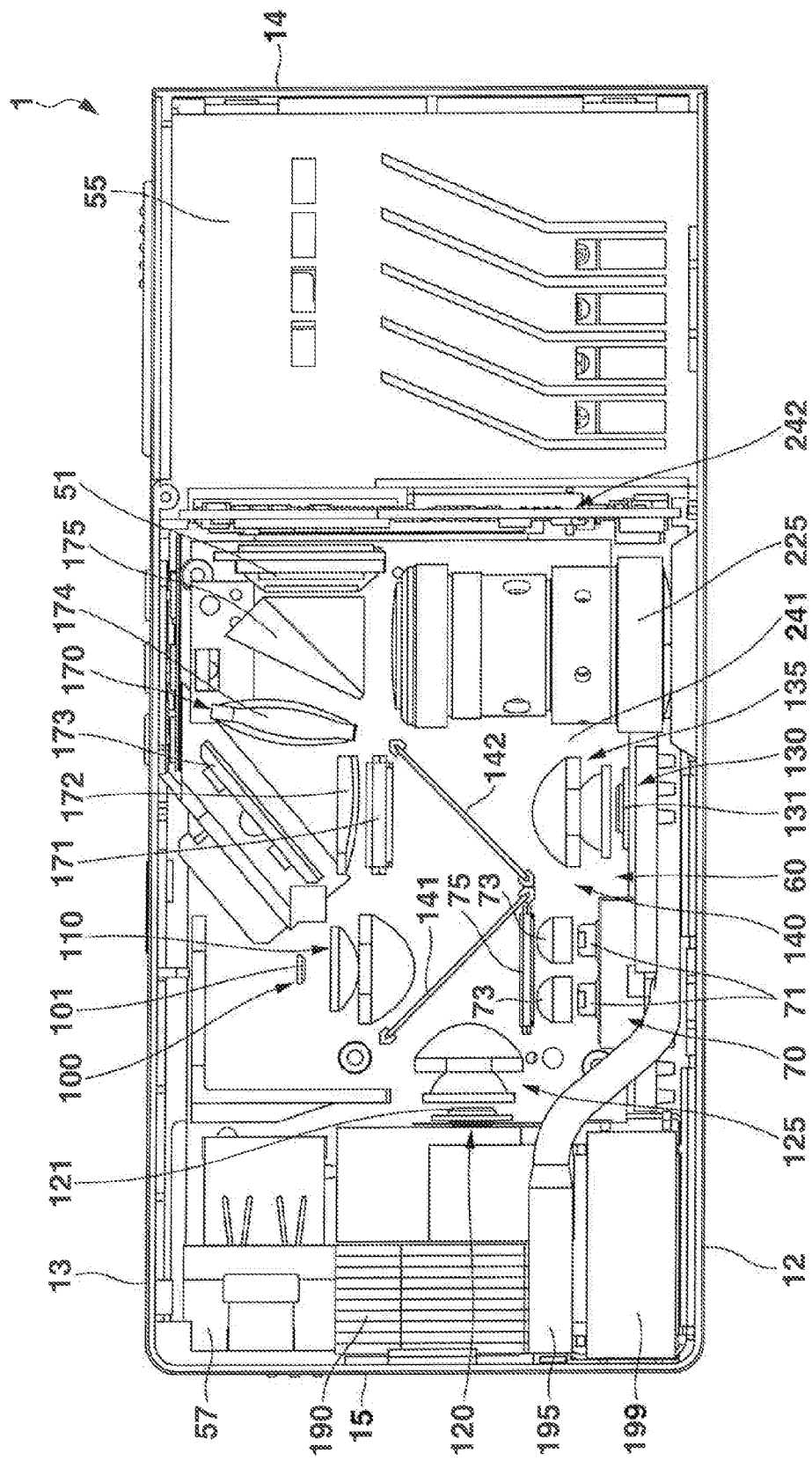
FIG. 3 is a schematic plan view showing an example of an internal construction of the projector according to the embodiment of the invention with an upper case removed.

Next, an internal construction of the projector 1 will be described. FIG. 3 is a schematic plan view showing the internal construction of the projector 1. As shown in FIG. 3, in the projector 1, the light source unit 60 is provided at a central portion, and a lens barrel 225 that incorporates therein the projection optical system is provided to the left of the light source unit 60. A battery 55 is provided between the lens barrel 225 and a left-side panel 14.

In the projector 1, the display element 51, which is a DMD or the like, is provided between the lens barrel 225 and the back panel 13 while lying near the battery 55, and the display device 51 is disposed parallel to the left-hand side panel 14. Further, in the projector 1, a main control circuit board 241 is provided underneath the light source unit 60, and a power supply control circuit board 242 is provided between the lens barrel 225 and the battery 55.

Additionally, in the projector 1, the light guiding optical system 170 is provided between the lens barrel 225 and the back panel 13 on a left-hand side of the light source unit 60. This light guiding optical system 170 shines the light emitted from the light source unit 60 on to the display element 51 and aligns the axis of "on" light that is reflected at the display element 51 with the optical axis of the projection optical system for emission towards the projection optical system.

Additionally, in the projector 1, a power supply connector 57, a heat sink 190 for the red light source 121, which will be described later, a heat pipe 195 that guides heat generated in the excitation light sources 71 and the blue light source 131, both of which will be described later, to the heat sink 190, and a cooling fan 199 are provided sequentially in that order from a side of the back panel 13 between the light source unit 60 and the right-hand side pane 15.

The light source unit 60 includes the excitation light shining device 70 and the luminescent light emitting device 100 that make up a green light source device together, the red light source device 120, the blue light source device 130 and the light source optical system 140.

The excitation light shining device 70 is disposed near the cooling fan 199 sideways while lying near the front panel 12. The luminescent light emitting device 100 which includes the luminescent material plate 101 is disposed near the power supply connector 57 while lying near the back panel 13. The red light source device 120 is disposed between the excitation light shining device 70 and the luminescent material plate 101, and the blue light source device 130 is disposed between the excitation light shining device 70 and the lens barrel 225.

Additionally, the light source optical system 140 is disposed at the rear of the excitation light shining device 70 and the blue light source device 130 to thereby guide light in the green wavelength range that is emitted from the luminescent light emitting device 100, light in the red wavelength range that is emitted from the red light source device 120 and light in the blue wavelength range that is emitted from the blue light source device 130 to the light guiding optical system 170.

The excitation light shining device 70 includes the two excitation light sources 71 whose optical axes are parallel to the left-hand side panel 14, two collimator lenses 73 that are disposed on the optical axes of the excitation light sources 71 and the microlens array 75 that is disposed at the front of the collimator lenses 73.

The excitation light sources 71 are blue laser oscillators and emit laser beams in the blue wavelength range towards the luminescent material plate 101. Additionally, the excitation light sources 71 are in contact with the heat pipe 195 by way of substrates for the excitation light sources 71 and are cooled by the heat sink 190 via the heat pipe 195.

The collimator lenses 73 convert light emitted from the excitation light sources 71 into parallel pencils of light to be shone on to the microlens array 75. This microlens array 75 is intended to shine excitation light from the excitation light sources 71 of the excitation light shining device 70 on to the luminescent material plate 101 of the luminescent light emitting device 100 as light with uniform optical distribution.

The luminescent material plate 101 is formed into a plate-shape that is formed of a binder such as a ceramic having high heat conductivity and light transmissivity such as Al2O3 or the like and a green luminescent material that is uniformly scattered in this binder. The reflecting mirror layer 102, which is a total reflecting mirror layer, is formed on a rear surface of the luminescent material plate 101, and this total reflecting mirror layer 102 is formed of a metallic film of silver or aluminum or the like.

Consequently, the luminescent material plate 101 receives laser beams that are emitted from the excitation light sources 71 as excitation light to thereby emit green luminescent light from the same surface as a surface on which the excitation light is incident. Additionally, the luminescent material plate 101 has a similar or analogous shape to the shape of the display element 51, so that the sectional shape of a pencil of light that is emitted from the luminescent material plate 101 that is formed into the green luminescent material becomes similar to the shape of the display element 51.

The red light source device 120 includes the red light source 121 whose optical axis is parallel to the front panel 12 and a collective lens 125 that is disposed at the front of the red light source 121. The red light source 121 is a red light emitting diode and is cooled by the heat sink 190.

In addition, the blue light source device 130 includes the blue light source 131 whose optical axis is parallel to those of the excitation light sources 71 and a collective lens 135 that is disposed at the front of the blue light source 131. The blue light source 131 is a blue light emitting diode and is cooled by the heat sink 190 via the heat pipe 195.

The light source optical system 140 is made up of a first dichroic mirror 141 and a second dichroic mirror 142. The first dichroic mirror 141 transmits light emitted from the excitation light shining device 70 and the red light source device 120 and reflects luminescent light that is emitted from the luminescent material plate 101. The second dichroic mirror 142 reflects light that is emitted from the red light source device 120 and luminescent light that is emitted from the luminescent material plate 101 and transmits light that is emitted from the blue light source device 130.

The first dichroic mirror 141 is disposed in a position where the optical axis of the excitation light shining device 70 intersects the optical axis of the red light source device 120. Further, the second dichroic mirror 142 is disposed in a position where the optical axis of the red light source device 120 intersects the optical axis of the blue light source device 130.

In the light source unit 60 that has the luminescent light emitting device 100 that causes the luminescent material to be luminous by using light from the laser oscillators as excitation light, pencils of light that are emitted from the excitation light sources 71 that are the laser oscillators are highly directive and have very strong peak powers, and therefore, there have been fears that those pencils of light are shone strongly on to part of the luminescent material plate 101 to thereby generate a brightness saturation or a destruction by burning in the luminescent material thereat.

Then, in the light source unit 60 of this embodiment, the microlens array 75 is disposed at the front of the excitation light sources 71 to thereby convert the laser beams having the strong peak powers into pencils of light having sectional shapes that are similar to the shape of the luminescent material layer so as to be shone on to the whole of the luminescent material plate 101 substantially uniformly. Thus, not only can the life of the luminescent light emitting device 100 be extended, but also green light can be emitted which distributes its intensity uniformly thereacross so as to be suitable for formation of a projected image.

The light guiding optical system 170 is made up of a microlens array 171, an axis changing mirror 173 that changes the direction of the axis of light that is emitted from the light source unit 60 towards the display element 51, a collective lens 172 that is disposed between the axis changing mirror 173 and the microlens array 171, a collective lens 174 that lies on the axis of the light that is changed by the axis changing mirror 173, and a prism 175.

The microlens array 171 of the light guiding optical system 170 converts the pencils of light that are emitted from the red light source 121, the blue light source 131 and the luminescent light emitting device 100 which are in the light source unit 60 into a plurality of pencils of light having rectangular sectional shapes that match the shape of the display element 51. Then, the plurality of pencils of light are collected by the microlens array 171 or the collective lens or the like so that central positions of the pencils of light are superposed one on another on the display element 51 for mixture, whereby the pencils of light are converted into a pencil of light in which the intensity is distributed uniformly across the light.

The prism 175 functions as a condenser lens that shines the light source light on to the display element 51 and as an axis changing device that changes the direction of the axis of projected light that is generated in the display element 51 so as to be aligned with the optical axis of the projection optical system that is installed in the lens barrel 225.

The projection optical system that is installed in the lens barrel 225 is made up of a fixed lens group and a movable lens group, and lenses of the movable lens group are operated in the direction of the optical axis thereof by controlling the lens motor 45 that has been described before to thereby realize a zooming function and a focusing function.

In addition, the battery 55 is a power supply that drives the projector 1 and is a secondary or rechargeable battery that can be charged by a commercial power supply. A secondary battery such as a lithium ion battery, a nickel-metal hydride battery or the like can be applied to the battery 55. Thus, the projector 1 of this embodiment can project an image by the electric power of the battery 55 in a cordless fashion.

The light source unit 60 includes the red light source 121 and the blue light source 131 in addition to the excitation light shining device 70 and the luminescent light emitting device 100 that make up the green light source device together, and therefore, the light source unit 60 can generate lights in the wavelength ranges of the three primary colors, that is, in the red, green and blue wavelength ranges. Thus, the light source unit 60 can be used as the light source in the projector 1 that can project a full-color image.

Additionally, the luminescent material does not have to be rotated in order to prevent the brightness saturation or the destruction by burning of the luminescent material, and therefore, a driving device such as a motor to drive to rotate the luminescent material becomes unnecessary, thereby making it possible to make the light source unit 60 and the projector 1 small in size.

Figure 4:
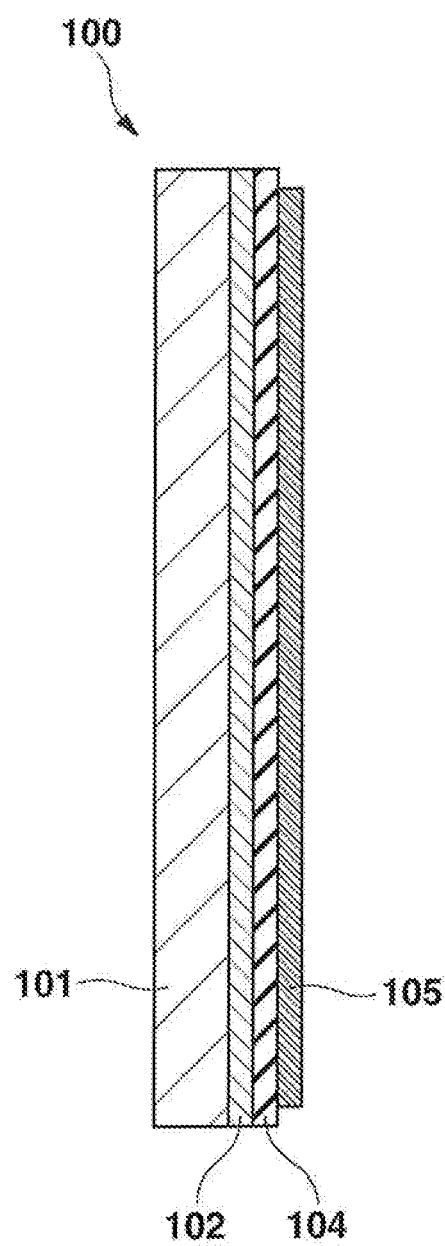
FIG. 4 is a sectional side view of a luminescent light emitting device according to the embodiment of the invention.
Figure 5:
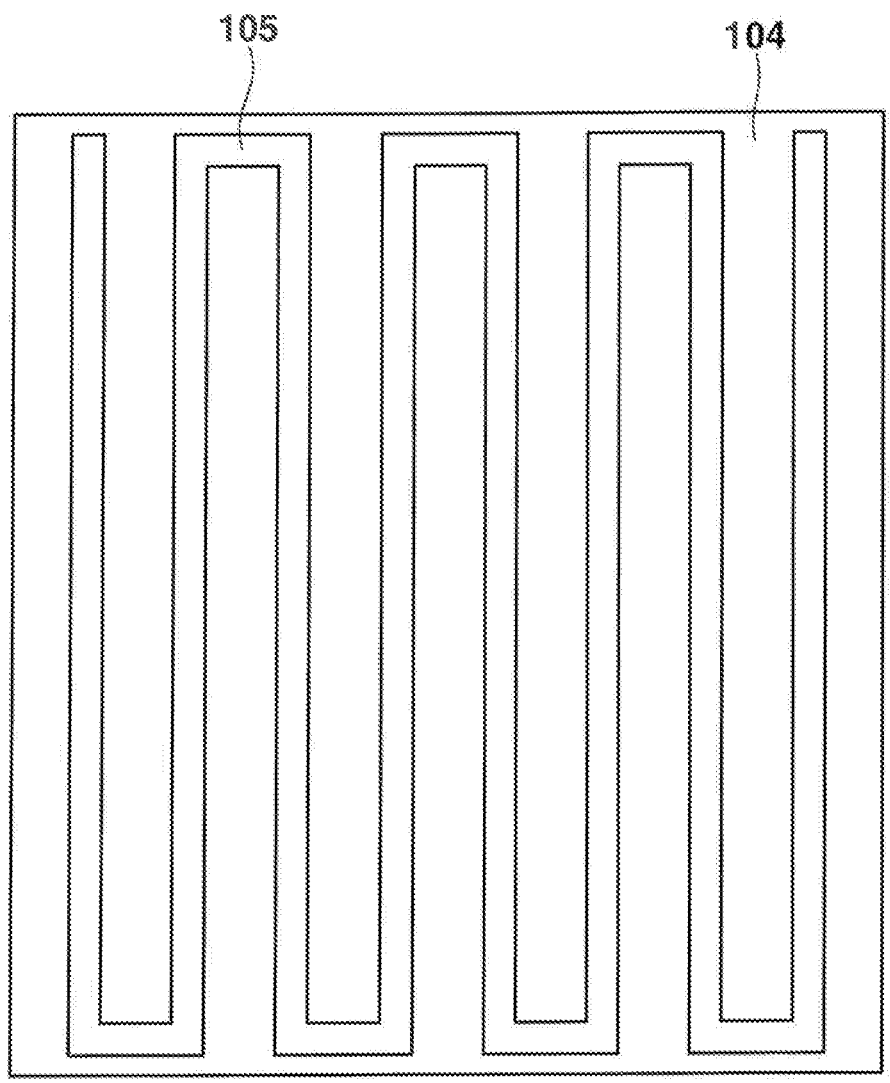
FIG. 5 is a schematic diagram showing schematically a conductive thin wire film in the luminescent light emitting device according to the embodiment of the invention.

To describe the luminescent light emitting device 100 used in the projector 1 in detail, as shown in FIG. 4, the total reflecting mirror layer 102 is formed on the rear surface of the luminescent material plate 101. Further, the conductive thin wire film 105 is formed on the rear surface of the total reflecting mirror layer 102 via an insulating layer 104. This conductive thin wire film 105 is formed on a rear surface of the insulating layer 104 as a line of conductive thin wire as shown in FIG. 5, and the line of conductive thin wire is disposed so as to snake over a whole rear surface of the luminescent material plate 101 on which the total reflecting mirror layer 102 is formed.

The luminescent material plate 101 utilizes a plate that is formed from a luminescent material such as YAG:Ce or LuAG:Ce or a plate that is formed by calcining a ceramic such as $Al_2O_3$ or the like and a luminescent light emitting material.

The total reflecting mirror layer 102 reflects at least light in the visible wavelength range and is formed by using a metallic reflecting film of silver or aluminum or the like or a laminated film of a metallic oxide or a fluoride.

Further, the insulation layer 104 is formed of an insulation thin film of $Al_2O_3$ or the like.

Figure 6:
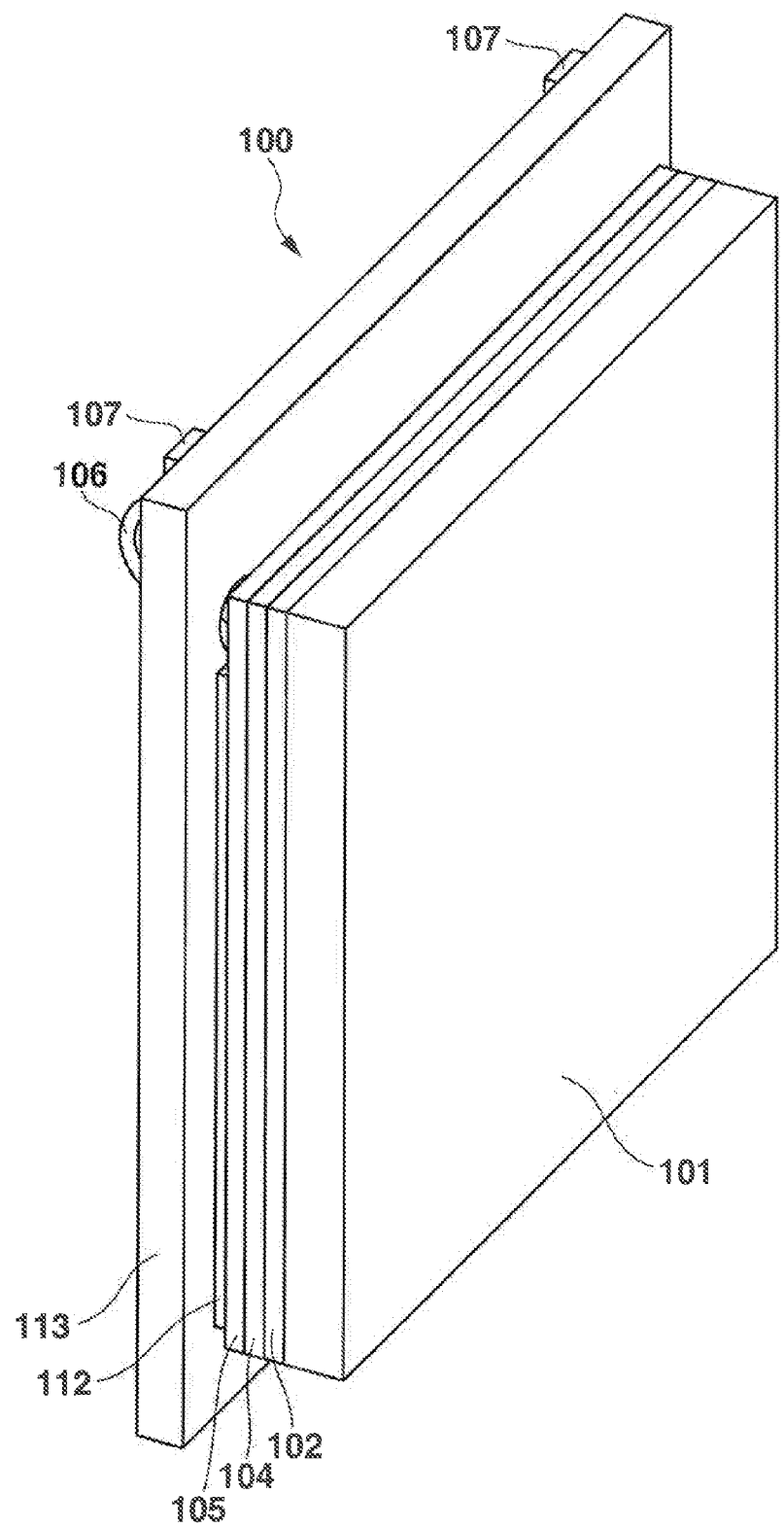
FIG. 6 is an overall perspective view of the luminescent light emitting device according to the embodiment of the invention.
Figure 7:
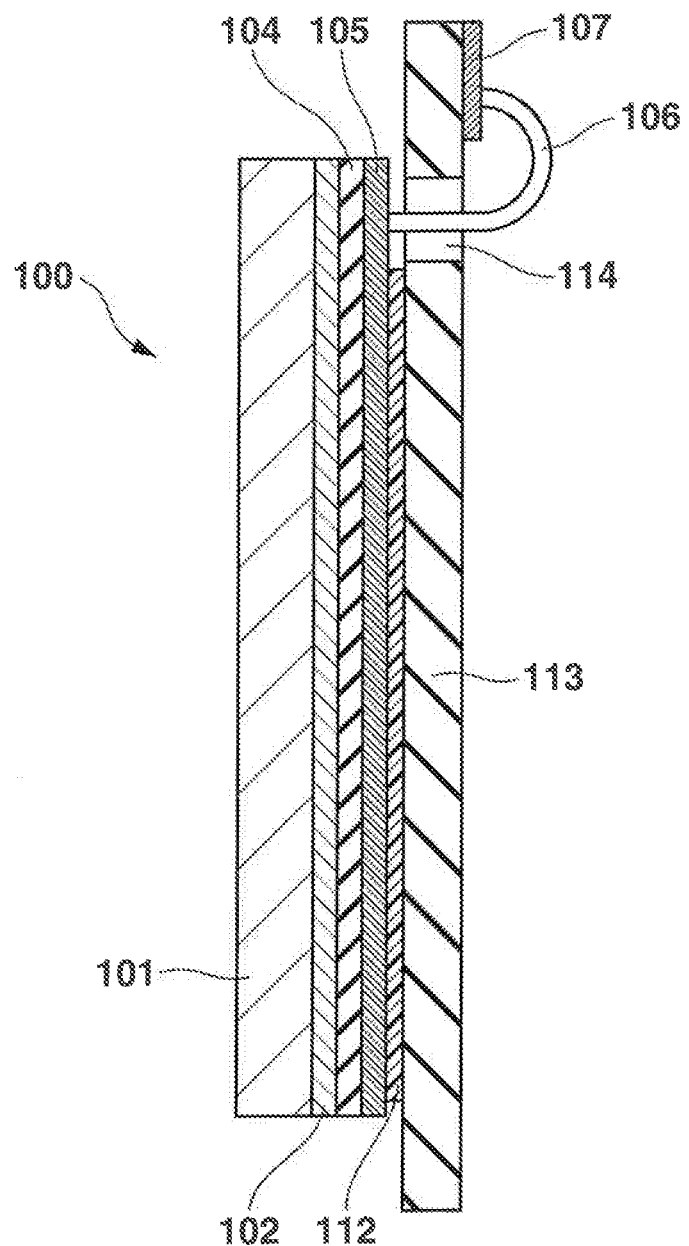
FIG. 7 is an overall sectional side view of the luminescent light emitting device according to the embodiment of the invention.
Figure 8:
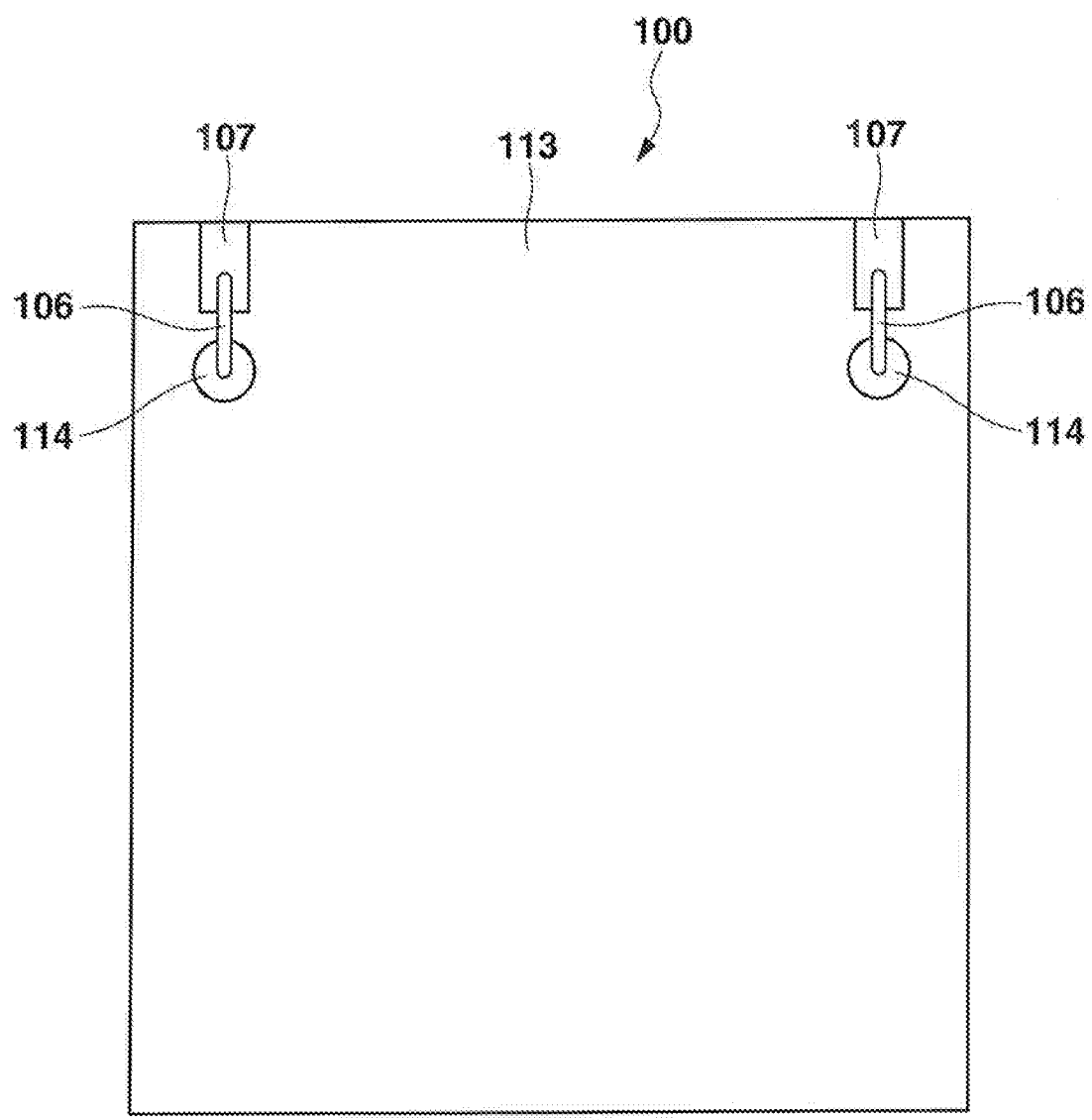
FIG. 8 is a rear view of the luminescent light emitting device according to the embodiment of the invention.

As shown in FIGS. 6 and 7, in the luminescent light emitting device 100, the luminescent material plate 101 is fixed to a front surface of a retaining substrate 113 by using further a thin connecting material 112. Additionally, connecting wires 106 that are connected to both ends of the conductive thin wire that is formed into the conductive thin wire film 105 are connected to electrodes 107 that are formed on the retaining substrate 113 via through holes 114 as shown in FIG. 8.

It is preferable that this retaining substrate 113 has high heat conductivity and insulation characteristics, and a metallic plate, a heat conductive ceramic plate or the like on which an insulation film is formed is used for the retaining substrate 113.

The conductive thin wire film 105 in which the thin wire is formed so as to snake in such a way as to cover the whole of the luminescent material plate 101 is provided on the whole rear surface of the luminescent material plate 101 so as to cover the whole of the rear surface. Therefore, when the luminescent material plate 101 is damaged, the conductive thin wire is also damaged to be disconnected.

Consequently, in case that an extremely weak current is applied to the conductive thin wire of the conductive thin wire film 105 between the electrodes 107 through the electrodes 107, when the luminescent material plate 101 is damaged, the energization between the electrodes 107 is interrupted to thereby detect the damage done to the luminescent material plate 101, whereby the operation of the light source unit 60 including the excitation light sources 71 and the like or the projector 1 can be stopped.

In the event that a material having insulation characteristics is used as the total reflecting mirror layer 102 without using a metallic film having conductivity that is made of silver, aluminum or the like, the insulation layer 104 can be omitted.

As the luminescent light emitting device 100, the invention is not limited to the luminescent light emitting device 100 according to the first embodiment that receives the excitation light from the front and emits the luminescent light to the front. According to a second embodiment, there is provided a luminescent light emitting device 100 in which excitation light is incident on a rear surface of a luminescent material plate 101 and resulting luminescent light is emitted to the front of the luminescent material plate 101.

Figure 9:
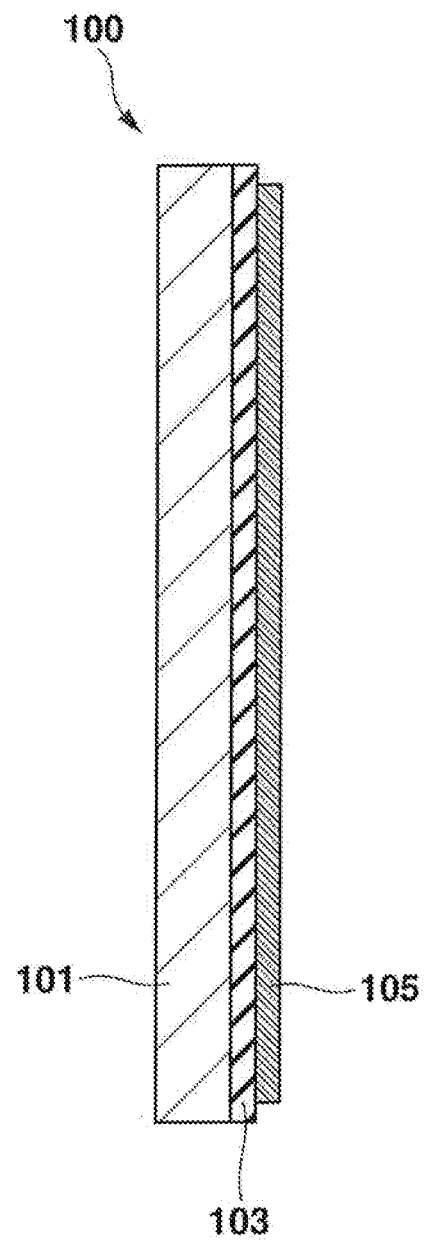
FIG. 9 is a sectional side view of a luminescent light emitting device according to a second embodiment of the invention.

In the luminescent light emitting device 100 according to the second embodiment, as shown in FIG. 9, a dichroic mirror layer 103 is provided on the rear surface of the luminescent material plate 101, and a conductive thin wire film 105 is mounted on the dichroic mirror layer 103.

The dichroic mirror layer 103 transmits excitation light in the blue wavelength range and reflects luminescent light in the green wavelength range.

The conductive thin wire film 105 is formed on a rear surface of the dichroic mirror layer 103 as a snaking thin wire having light transmissivity by using zinc oxide or indium tin oxide that is a transparent electrode material.

Figure 10:
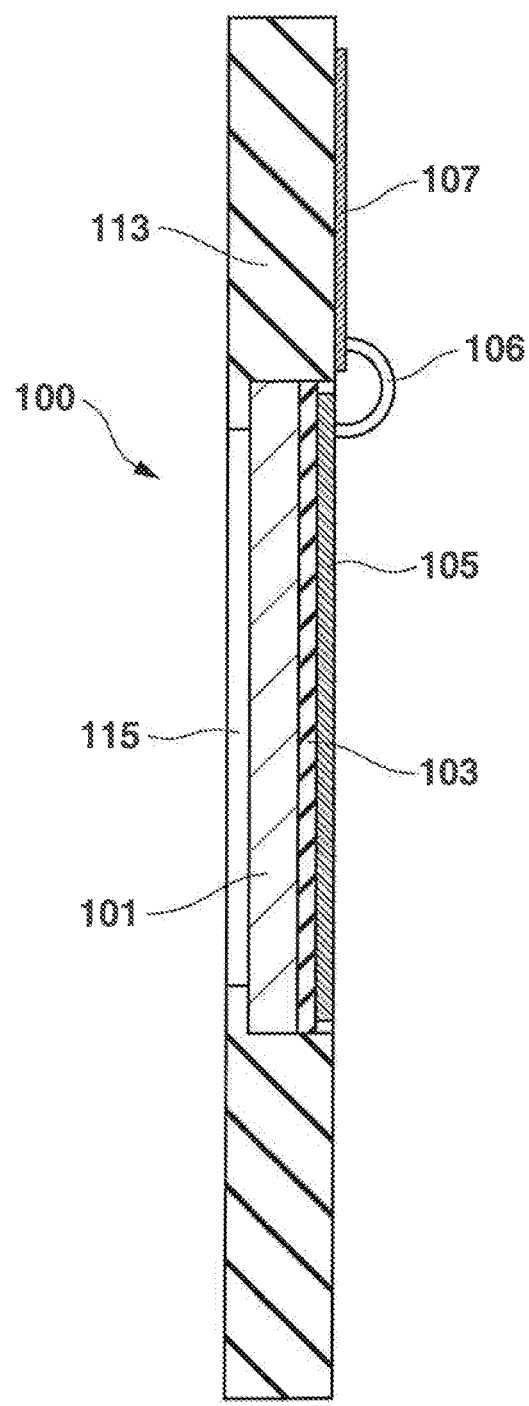
FIG. 10 is an overall sectional view of the luminescent light emitting device according to the second embodiment of the invention.
Figure 11:
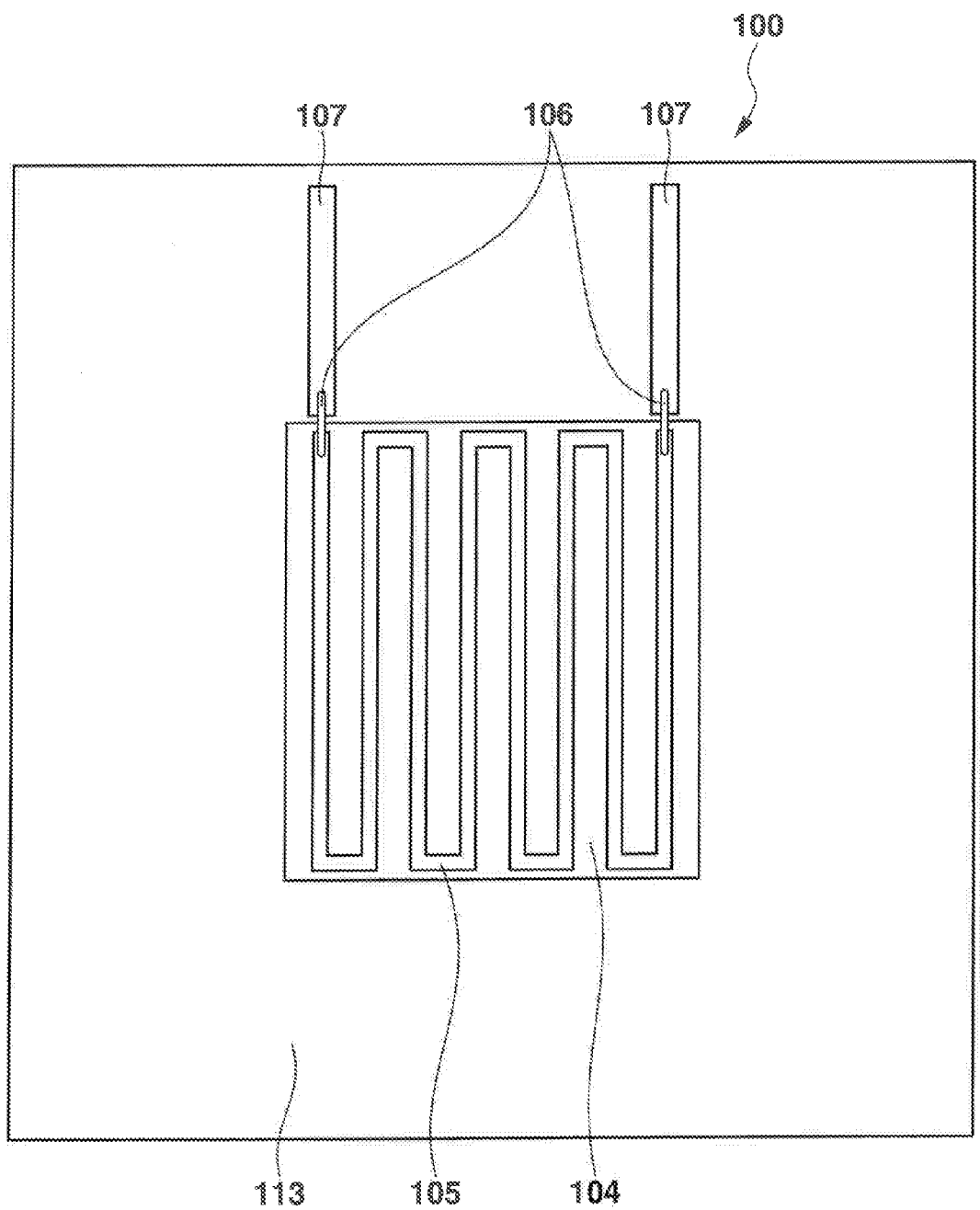
FIG. 11 is a rear view of the luminescent light emitting device according to the second embodiment of the invention.

In this luminescent light emitting device 100, as shown in FIG. 10, an opening portion is formed in a retaining substrate 113, and the luminescent light emitting device 100 is fixed to be retained to the retaining substrate 113 in such a way as to be fitted in the opening portion. Then, as shown in FIG. 11, electrodes 107 are provided near the opening portion on the rear surface of the retaining substrate 113. Both ends of the conductive thin wire are individually connected to the electrodes 107 by connecting wires 106.

In the luminescent light emitting device 100 of the second embodiment, the excitation light that passes through the luminescent material plate 101 and the luminescent light that is emitted from the luminescent material plate 101 are emitted in the same direction, and therefore, a dichroic mirror 141 that transmits the excitation light and reflects the luminescent light to change the direction of emission thereof is disposed at the front of the luminescent light emitting device 100 so as to prevent the luminescent light from being emitted to the outside of the light guiding optical system and hence the projector 1. Thus, it is possible to provide the projector 1 that enhances the safety thereof.

In addition, the luminescent material plate 101 of the luminescent light emitting device 100 is not limited to the combination of the ceramic binder and the green luminescent material. There may be a case where a luminescent material is used that emits luminescent light in either of the other wavelength ranges than the green wavelength rage.

Then, in addition to the configuration described above in which the luminescent material plate 101 emits the luminescent light in the green wavelength range, when the luminescent material plate 101 emits luminescent light in either of the other wavelength ranges than the green wavelength range, the excitation light sources 71 do not utilize the laser oscillators that emit the laser beams in the blue wavelength range. Instead, laser oscillators that emit laser beams in the other wavelength ranges than the green wavelength range such as ultraviolet laser oscillators are used for the excitation light sources 71.

Further, since the luminescent light emitting device 100 can be a high-intense light emitting device, its application is not limited to the light emitting device for the projector 1.

Thus, the luminescent light emitting device 100 can be used as a light emitting device for various applications.

Figure 12:
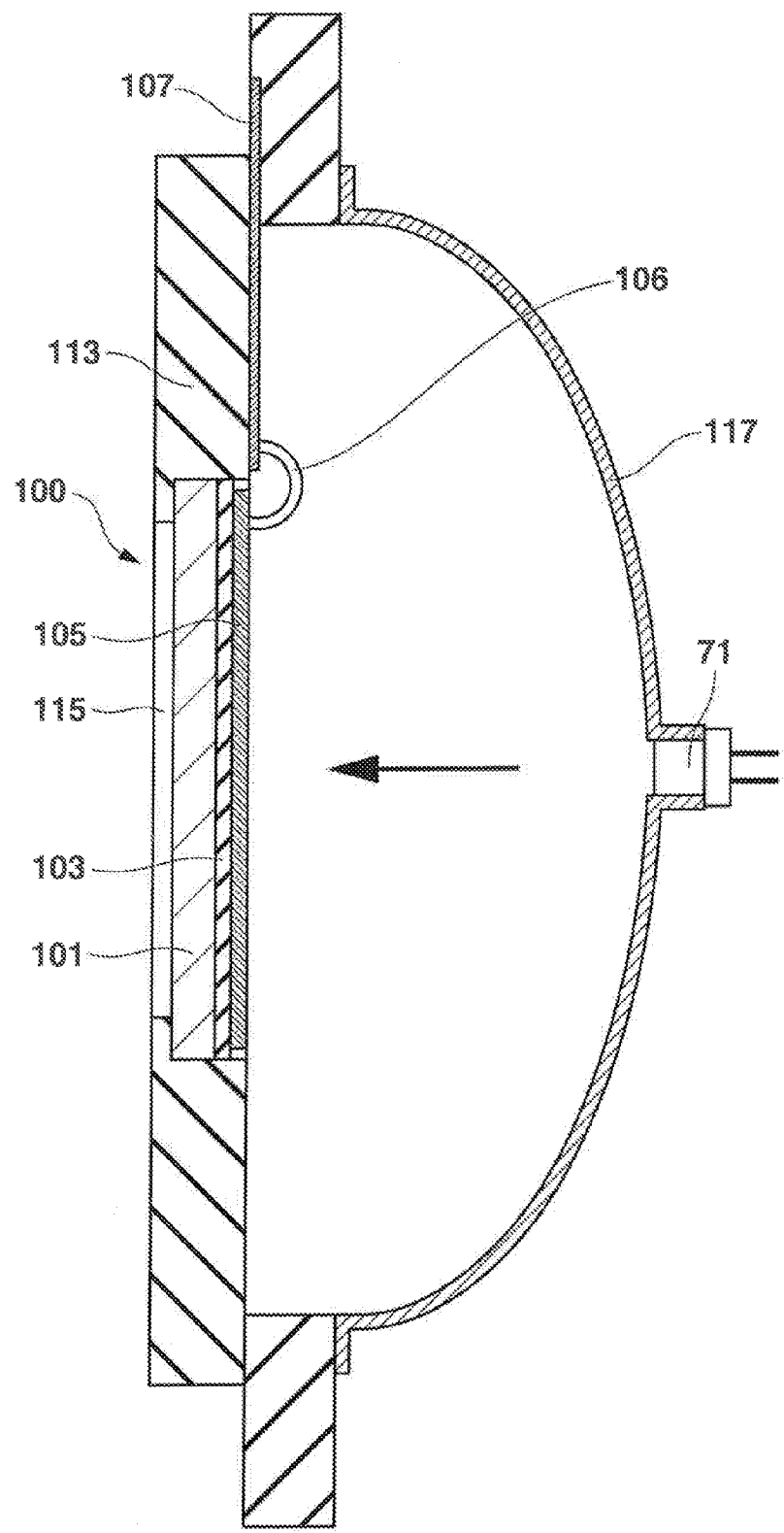
FIG. 12 is an overall sectional view of a luminescent light emitting device according to a modified example made to the second embodiment of the invention.

Because of this, as shown in FIG. 12, a configuration may be adopted in which a luminescent light emitting device 100 is formed into a unit by providing a reflector 117 on a rear surface side of a luminescent material plate 101 and integrating an excitation light source 71 with the luminescent material plate 101. As this occurs, with a dichroic mirror layer 103 omitted, a conductive thin wire film 105 is provided directly on a rear surface of the luminescent material plate 101 so as to detect damage done to the luminescent material plate 101 by the conductive thin wire film 105, so that the illumination of the excitation light source 71 is stopped when damage is detected.

In addition, as this occurs, light emitted from the excitation light source 71 that is a laser oscillator is diffused so that the light can be shone on to a whole surface of the luminescent material plate 101. Alternatively, a plurality of excitation light sources 71 are used, and with light emitted from each of the excitation light sources 71 diffused, excitation light is shone on to a whole surface of the luminescent material plate 101 by the plurality of excitation light sources 71.

Figure 13:
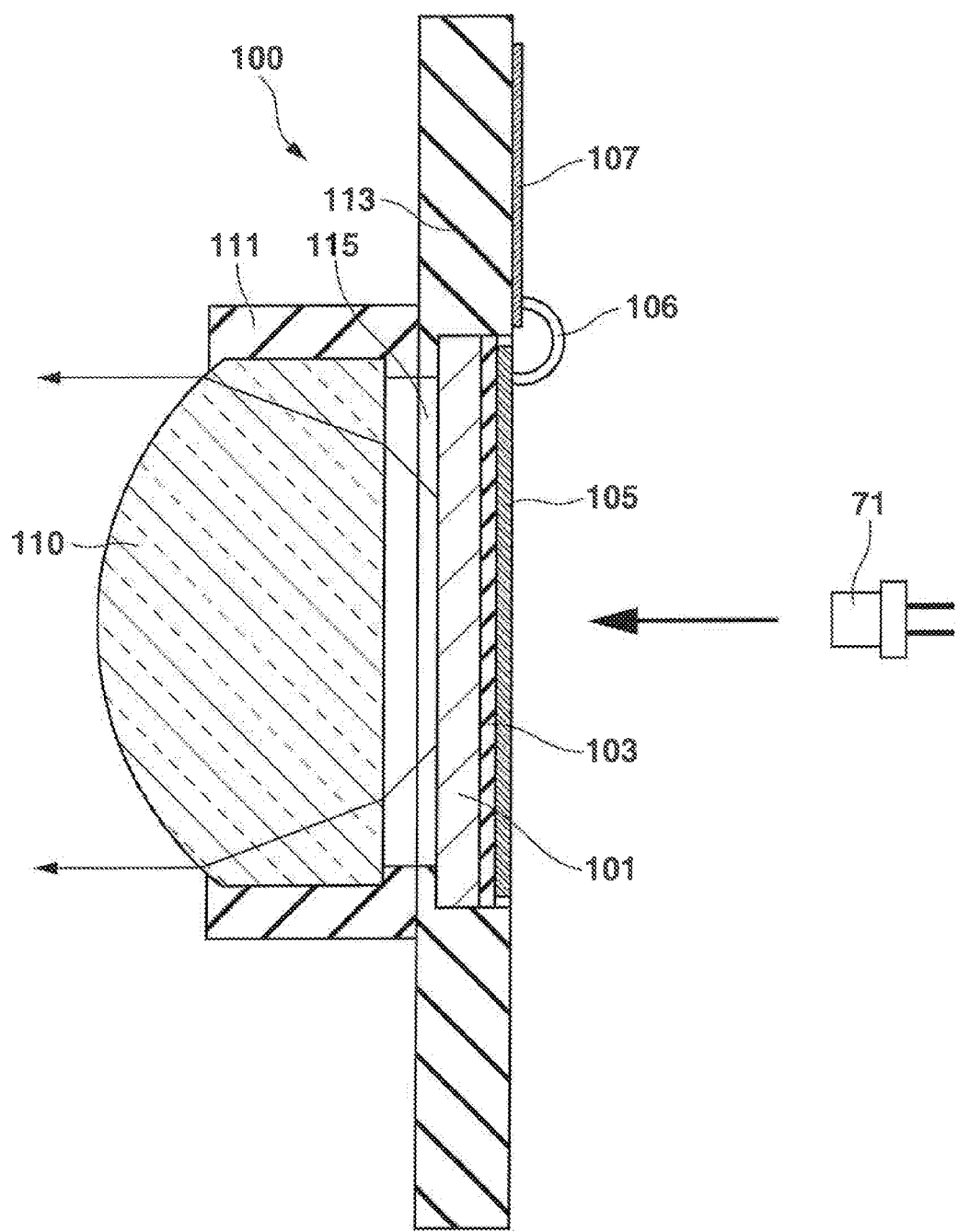
FIG. 13 is an overall sectional view of a luminescent light emitting device according to another modified example made to the second embodiment of the invention.

Further, as shown in FIG. 13, a configuration may also be adopted in which a lens retaining frame 111 is provided on a retaining substrate 113 so that a collective lens 110 is disposed at the front of a luminescent material plate 101, and the collective lens 110 is disposed at the front of an opening portion 115.

As this occurs, too, excitation light that is light emitted from an excitation light source 71 is shone on to the whole of a rear surface of a luminescent material plate 101 as diffuse light. The collective lens 110 is provided so as to collect as required the high-intensity luminescent light that is emitted from the luminescent material plate 101 in response to an illumination target.

In this way, in the luminescent light emitting device 100 according to the embodiments of the invention, the conductive thin wire film 105 is formed on the rear surface of the luminescent material plate 101 via the total reflecting mirror layer 102 or the dichroic mirror layer 103. Therefore, when damage is done to the luminescent material plate 101, the conductive thin wire is damaged to thereby interrupt the energization, whereby it is possible to detect easily and in an ensured fashion that the luminescent material plate 101 is damaged.

Consequently, the luminescent light emitting device 100 can be used as a safe light source that emits high-intensity luminescent light, and the projector 1 can easily be formed into a small projector that can form a bright projected image by incorporating the luminescent light emitting device 100 in the projector 1.

Then, the conductive thin wire is snaked in such a way as to cover the whole of the rear surface of the luminescent material plate 101, whereby the single conductive thin wire can easily be disposed on the whole of the rear surface of the luminescent material plate 101. Thus, even though local damage is caused in any portion of the luminescent material plate 101, the damage can easily be detected.

Additionally, with the insulation layer 104 interposed between the total reflecting mirror layer 102 and the conductive thin wire film 105, it is easy to fabricate the luminescent light emitting device 100 that emits luminescent light only to the front while making use of a metallic thin film as the total reflecting mirror layer 102.

In addition, with the luminescent material plate 101 retained by the retaining substrate 113 and the electrodes 107 that connect to the conductive thin wire provided in the retaining substrate 113, it is easy to handle the luminescent light emitting device 100 when installing it in various devices and pieces of equipment.

Further, with the reflector 117 provided on the rear surface of the luminescent material plate 101, it is easy to adopt the luminescent light emitting device 100 as a light source that matches an illumination object as required. With the collective lens 110 disposed on a front surface of the luminescent material plate 101, the luminescent light emitting device 100 is allowed to emit light that is suitable for an illumination object.

While the invention has been described by reference to the embodiments, the embodiments are presented as examples and are not intended at all to limit the scope of the invention. These novel embodiments can be carried out in other various forms, and various omissions, replacements or modifications can be made without departing from the spirit and scope of the invention. These embodiments and modifications thereof are included in the spirit and scope of the invention and are also included in the scope of inventions described under claims and their equivalents.

What is claimed is:

1. A luminescent light emitting device comprising:
a mirror layer;
a luminescent material plate that is formed on a first surface side of the mirror layer; and
a conductive thin wire film in which a conductive thin wire is disposed, and which is provided on a second surface side of the mirror layer,
wherein luminescent light that is emitted by the luminescent material plate is emitted to a first surface side of the luminescent material plate by the mirror layer, and
wherein damage to the luminescent material plate is detected by a disconnection of the conductive thin wire.

2. The luminescent light emitting device according to claim 1, wherein the mirror layer comprises a total reflecting mirror layer or a dichroic mirror layer.

3. The luminescent light emitting device according to claim 1,
wherein the conductive thin wire is disposed in a snaking configuration, and
wherein the conductive thin wire film substantially covers an entire surface of the luminescent material plate.

4. The luminescent light emitting device according to claim 2,
wherein the conductive thin wire is disposed in a snaking configuration, and
wherein the conductive thin wire film substantially covers an entire surface of the luminescent material plate.

5. The luminescent light emitting device according to claim 1, wherein an insulation layer is interposed between the mirror layer and the conductive thin wire film.

6. The luminescent light emitting device according to claim 2, wherein an insulation layer is interposed between the mirror layer and the conductive thin wire film.

7. The luminescent light emitting device according to claim 3, wherein an insulation layer is interposed between the mirror layer and the conductive thin wire film.

8. The luminescent light emitting device according to claim 4, wherein an insulation layer is interposed between the mirror layer and the conductive thin wire film.

9. The luminescent light emitting device according to claim 1, further comprising:
a retaining substrate that retains the luminescent material plate, wherein the retaining substrate includes electrodes that are electrically connected to both ends of the conductive thin wire.

10. The luminescent light emitting device according to claim 2, further comprising:
a retaining substrate that retains the luminescent material plate,
wherein the retaining substrate includes electrodes that are electrically connected to both ends of the conductive thin wire.

11. The luminescent light emitting device according to claim 3, further comprising:
a retaining substrate that retains the luminescent material plate,
wherein the retaining substrate includes electrodes that are electrically connected to both ends of the conductive thin wire.

12. The luminescent light emitting device according to claim 4, further comprising:
a retaining substrate that retains the luminescent material plate,
wherein the retaining substrate includes electrodes that are electrically connected to both ends of the conductive thin wire.

13. The luminescent light emitting device according to claim 5, further comprising:
a retaining substrate that retains the luminescent material plate,
wherein the retaining substrate includes electrodes that are electrically connected to both ends of the conductive thin wire.

14. The luminescent light emitting device according to claim 6, further comprising:
a retaining substrate that retains the luminescent material plate,
wherein the retaining substrate includes electrodes that are electrically connected to both ends of the conductive thin wire.

15. The luminescent light emitting device according to claim 7, further comprising:
a retaining substrate that retains the luminescent material plate,
wherein the retaining substrate includes electrodes that are electrically connected to both ends of the conductive thin wire.

16. The luminescent light emitting device according to claim 8, further comprising:
a retaining substrate that retains the luminescent material plate,
wherein the retaining substrate includes electrodes that are electrically connected to both ends of the conductive thin wire.

17. The luminescent light emitting device according to claim 9, further comprising:
a reflector that is fixed to the retaining substrate and that covers a second surface side of the luminescent material plate.

18. The luminescent light emitting device according to claim 9, further comprising:
a collective lens that is fixed to the retaining substrate and that is disposed at the first surface side of the luminescent material plate.

19. A projector comprising:
a luminescent light emitting device comprising a mirror layer, a luminescent material plate that is formed on a first surface side of the mirror layer, and a conductive thin wire film in which a conductive thin wire is disposed, and which is provided on a second surface side of the mirror layer, wherein luminescent light that is emitted by the luminescent material plate is emitted to a first surface side of the luminescent material plate by the mirror layer, and wherein damage to the luminescent material plate is detected by a disconnection of the conductive thin wire;
a display element that generates projected light;
a projection optical system that guides the projected light that is generated in the display element;
a light guiding optical system that guides light emitted from the luminescent light emitting device to the display element and that aligns the projected light generated in the display element with an optical axis of the projection optical system; and
a projector control unit that controls the luminescent light emitting device and the display element.

* * * * *